(12) United States Patent
Denaro (10) Patent No.: US 8,965,685 B1
(45) Date of Patent: Feb. 24, 2015

(54) METHOD AND SYSTEM FOR ENABLING PRECAUTIONARY ACTIONS IN A VEHICLE

(75) Inventor: Robert Denaro, Long Grove, IL (US)

(73) Assignee: HERE Global B.V., Veldhoven (NL)

( * ) Notice: Subject to any disclaimer, the term of this patent is extended or adjusted under 35 U.S.C. 154(b) by 2182 days.

(21) Appl. No.: 11/400,151

(22) Filed: Apr. 7, 2006

(51) Int. Cl.
*G01C 21/34* (2006.01)

(52) U.S. Cl.
USPC ........... 701/423; 340/438; 340/905; 701/410; 701/411

(58) Field of Classification Search
USPC ......... 701/207, 200, 117, 119, 400, 408–499; 701/500–541; 180/170, 171, 178, 179; 340/435, 438, 901, 905
See application file for complete search history.

(56) References Cited

U.S. PATENT DOCUMENTS

| | | | | |
|---|---|---|---|---|
| 5,315,295 | A * | 5/1994 | Fujii | 340/936 |
| 6,208,932 | B1 * | 3/2001 | Ohmura et al. | 701/538 |
| 6,405,128 | B1 * | 6/2002 | Bechtolsheim et al. | 701/431 |
| 6,466,867 | B1 * | 10/2002 | Sakashita | 701/437 |
| 6,470,265 | B1 * | 10/2002 | Tanaka | 701/532 |
| 6,553,130 | B1 * | 4/2003 | Lemelson et al. | 382/104 |
| 6,735,515 | B2 | 5/2004 | Bechtolsheim et al. | 701/208 |
| 7,057,532 | B2 | 6/2006 | Shafir et al. | 340/988 |
| 7,096,115 | B1 * | 8/2006 | Groth et al. | 701/117 |
| 2003/0016146 | A1 * | 1/2003 | Bates et al. | 340/988 |
| 2003/0043059 | A1 * | 3/2003 | Miller, Jr. | 340/989 |
| 2003/0090392 | A1 * | 5/2003 | Schuessler | 340/988 |
| 2004/0022416 | A1 * | 2/2004 | Lemelson et al. | 382/104 |
| 2004/0260467 | A1 * | 12/2004 | Wehrlen et al. | 701/213 |
| 2006/0097858 | A1 | 5/2006 | Kumabe et al. | 340/435 |

FOREIGN PATENT DOCUMENTS

WO  WO2006/045826 A1  5/2006  ............ G01S 413/93

OTHER PUBLICATIONS

"What is the Hazard Perception Test" on 2Pass.co.uk; availalbe to public Apr. 5, 2005; accessed via web.archive.org.*

* cited by examiner

*Primary Examiner* — Stephen Holwerda
(74) *Attorney, Agent, or Firm* — Lempia Summerfield Katz LLC (57) ABSTRACT

A feature for a motor vehicle that takes precautionary actions in response to conditions on the road network in the vicinity ahead of the vehicle. The feature uses a data representation of the road network extending from the current vehicle position out to an extent. The data representation of the road network is used to identify conditions, if any, that warrant taking a precautionary action. The type of conditions about which actions are to be taken may be identified in a data file. A precautionary action is taken as the vehicle approaches the location of the condition. The precautionary action may be a message provided to the vehicle driver to alert the driver about the condition. Alternatively, the action may be a modification of the vehicle operation, such as slowing down or stopping the vehicle, speeding up the vehicle, changing direction, and so on.

21 Claims, 6 Drawing Sheets

| CONDITION PRIORITY LIST | |
|---|---|
| 1 | ROAD ENDS |
| 2 | UNPAVED ROAD |
| 3 | NO SHOULDER |
| 4 | POTENTIAL ICE* |
| 5 | SPEED CHANGE > 30 |
| 6 | HIGH CURVATURE |
| 7 | TURN > 90° |
| 8 | CROSS STREET |
| 9 | TURN = 90° |
| 10 | TRAFFIC SIGNAL |
| 11 | SPEED CHANGE < 30 |
| 12 | TURN < 45° |

METHOD AND SYSTEM FOR ENABLING PRECAUTIONARY ACTIONS IN A VEHICLE

BACKGROUND OF THE INVENTION

The present invention relates to a feature for on-road vehicles that enables a precautionary action, such as warning the vehicle driver or braking, accelerating, or maneuvering the vehicle, to be taken in response to an upcoming condition on the road network.

Advanced driver assistance systems ("ADAS") have been developed to improve the comfort, efficiency, and overall satisfaction of driving. Examples of advanced driver assistance systems include adaptive headlight aiming, adaptive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar and vision-oriented sensors, such as cameras. Some advanced driver assistance systems also use digital map data. Digital map data can be used in advanced driver assistance systems to provide information about the road network, road geometry, road conditions and other items associated with the road around the vehicle. Digital map data is not affected by environmental conditions, such as fog, rain or snow. In addition, digital map data can provide useful information that cannot reliably be provided by cameras or radar, such as speed limits, traffic and lane restrictions, etc. Further, digital map data can be used to determine the road ahead of the vehicle even around corners or beyond obstructions. Accordingly, digital map data can be a useful addition for some advanced driver assistance systems.

U.S. Pat. Nos. 6,405,128 and 6,735,515 describe methods for using map data to provide driver assistance features. These patents describe formation of an electronic horizon for a vehicle. The electronic horizon contains a versatile, structured data representation of the road network around a vehicle that extends from the current position of the vehicle along accessible roads out to a threshold (i.e., the electronic horizon). The electronic horizon is recalculated as the vehicle moves. These patents also describe how an electronic horizon can be used, e.g., in conjunction with sensors in the vehicle, to provide curve warnings, intersection warnings, adjust transmission settings, and so on.

Included among the features described in these patents are the determination of a route-based path and the determination of a most-likely path. An electronic horizon may include multiple paths leading from a vehicle's current position. In the situation in which a vehicle driver is being provided guidance to follow a calculated route to a destination, part of the calculated route will coincide with one of the paths in the electronic horizon. This path may be identified as the route-based-path and data indicating the route-based-path may be stored with the electronic horizon data structure. Even if a vehicle is not following a calculated route to a destination, one of the paths from the vehicle's current position may be determined as the most-likely-path, and other feasible paths may be assigned lower probabilities of occurrence. The most-likely-path and lower probability paths are determined based on identifying the most likely maneuvers a driver may be expected to choose at each upcoming intersection within the electronic horizon. Determining the most likely maneuver that a vehicle driver may choose to take at an intersection is based on a predetermined ranking of all possible maneuvers at the intersection, taking into account turn angles, road function classes, traffic signals, speed limits, and other stored information about the road network.

The inventions disclosed in the '128 and '515 patents provide useful features. However, there exists room for further improvements. Accordingly, it is an objective to provide additional advantages when using a data model of the road network around a vehicle.

SUMMARY OF THE INVENTION

To address these and other objectives, the present invention comprises a feature for a motor vehicle that enables a precautionary action to be taken in response to an upcoming condition on the road network. The precautionary action may be a warning message provided to the vehicle driver to alert the vehicle driver about the condition on the road network in the vicinity ahead of the vehicle so that the vehicle driver can pay extra attention to the condition. Alternatively, the precautionary action may be an actual modification of the operation or control of the vehicle, such as braking, accelerating, or maneuvering the vehicle, aiming the headlights, or activating a sensor. Alternatively, the precautionary action may be providing an input to an algorithm that also processes inputs from other sensors for taking such actions. In another alternative, precautionary the action may include a combination of any of these.

The disclosed feature uses a data representation of the road network extending from the current vehicle position out to an extent. The data representation of the road network is used to identify conditions, if any, that warrant taking a precautionary action (e.g., such as providing a message alerting the driver or modifying operation of the vehicle or a sensor in the vehicle). The types of conditions about which such precautionary actions are to be provided may be identified in a data file. Based on identification of such a condition along the road network in proximity to the vehicle, data is stored that identifies the location of the condition so that a precautionary action may be taken as the vehicle approaches the location of the condition.

DETAILED DESCRIPTION OF THE DESCRIPTION OF THE PRESENTLY PREFERRED EMBODIMENTS

I. The Electronic Horizon System

The present embodiment relates to a feature for an advanced driver assistance system that uses a data representation of the road network around a vehicle. More specifically, the present embodiment includes a feature for a vehicle that enables taking precautionary actions in response to conditions in the road network in proximity to a vehicle's current position. In a present embodiment, such conditions are identified using a data representation of the road network around the vehicle (also referred to as an "electronic horizon"). Processes for forming and using a data representation of the road network around a vehicle are disclosed in U.S. Pat. Nos. 6,405,128 and 6,735,515, the entire disclosures of which are incorporated by reference herein.

Figure 1:
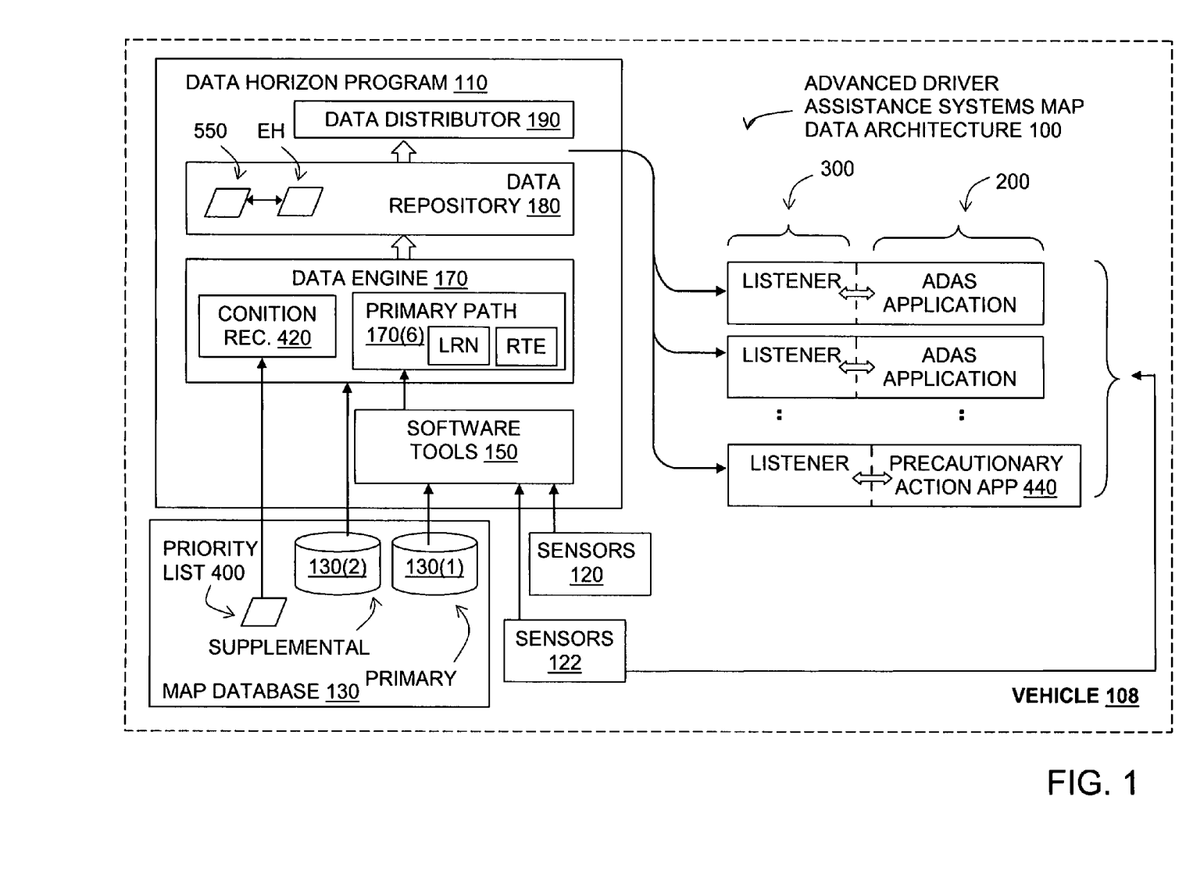
FIG. 1 is a functional block diagram of a present embodiment.

FIG. 1 is a functional block diagram of a system for a present embodiment. In FIG. 1, an advanced driver assistance systems map data architecture 100 is a combination of software and hardware components installed in a motor vehicle 108. The advanced driver assistance systems map data architecture 100 provides access to map-related data for use by advanced driver assistance system applications 200. The advanced driver assistance systems map data architecture 100 includes the following components.

(1). Sensors 120 and 122.—

The sensors 120 provide outputs that are used by programming in the advanced driver assistance systems map data architecture 100 to determine the position of the vehicle 108 on the road network and to provide other information, such as speed and heading of the vehicle. (In addition to these sensors 120, the advanced driver system applications 200 may use the outputs from other types of sensors 122. These other types of sensors 122 may include radar, lidar, ultrasound, infrared, video or other remote sensing and vision system-types of sensors.)

(2). A Map Database 130.—

The map database 130 includes information about geographic features, such as roads and points of interest, in the geographic area in which the vehicle 108 in which the advanced driver assistance systems map data architecture 100 is installed is traveling. In a present embodiment, the map database is installed locally in the vehicle, however, in alternative embodiments, some or all of the map data may be located remotely, e.g., on a remotely located map data server, and transmitted to the vehicle over a suitable (e.g., wireless) communications link or network.

(3). Data Horizon Program 110.—

The driver assistance systems map data architecture 100 includes a data horizon program 110. The data horizon program 110 includes the programming that uses the map database 130 and inputs from the sensors 120 and 122 to provide map-related data to the advanced driver assistance systems 200.

(4). Software Tool Components 150.—

In this embodiment, the software tool components 150 are a part of the data horizon program 110. The software tool components 150 include programming for accessing the map database 130 and software tool programs for performing certain required functions with the map data obtained from the map database 130.

(5). A Data Engine 170.—

The data engine 170 is a component of the data horizon program 110. The data engine 170 determines and obtains from the map database 130 the relevant data about the road lying ahead of (or behind or aside) the vehicle.

(6). A Data Repository 180.—

The data repository 180 is a component of the data horizon program 110. The data repository 180 contains the latest relevant data about the road lying ahead of (or behind) the vehicle as determined by the data engine 170.

(7). A Data Distributor 190.—

The data distributor 190 is a component of the data horizon program 110. The data distributor 190 provides notification that new data about the road lying ahead of (or behind) the vehicle has been stored in the data repository 180.

(8). One or More Advanced Driver Assistance Applications 200.—

These applications 200 use the map-related data provided by the data horizon program 110. These applications 200 may include adaptive headlight aiming, adaptive cruise control, obstruction detection, warning and avoidance, collision warning, avoidance, and mitigation, adaptive shift control, blind spot detection, warning and avoidance, drowsy driver detection, lane and road departure warning, lane keeping, hybrid power train management, electronic stability control and others. In one embodiment, the applications include a precautionary action application 440, described in more detail below.

(9). One or More Data Listeners 300.—

A data listener 300 is a software component used for obtaining data from the data horizon program 110. A data listener 300 receives the notifications from the data distributor 190 and obtains data from the data repository 180. A data listener 300 may be implemented as part of each driver assistance application 200 or a data listener may be implemented as a standalone software component.

The Map Database(s) 130

Referring still to FIG. 1, the map database 130 includes information about roads, intersections, points of interest, and possibly other geographic and road three-dimensional geometric features in the geographic region in which the vehicle 108 in which the advanced driver assistance systems map data architecture 100 is installed is traveling. In the embodiment shown in FIG. 1, the map database 130 is formed of one or more component databases. Specifically, the map database 130 includes a primary database 130(1) and a supplementary database 130(2). Alternatively, the data in map database 130 (1) and the supplementary database 130(2) might be combined in a single database.

The primary map database 130(1) may be similar or identical to a database used in in-vehicle navigation systems. According to this embodiment, the primary map database 130(1) supports navigation-related functions, including vehicle positioning, route calculation, route guidance, and map display. The primary database 130(1) also provides support for a portion of the advanced driver assistance system functions. In this embodiment, the primary database 130(1) also provides a portion of the data readings provided to the driver assistance applications 200, as described below.

The supplementary database 130(2) also contains data about roads and intersections in the geographic region. However, the supplementary database 130(2) includes data that is not necessarily provided in the primary map database 130(1) such as road gradient and bank (i.e., superelevation). The supplementary map database 130(2) may include higher quality (i.e., more accurate) data than the data which is contained in the primary database 130(1). For example, with respect to road geometry, the data in the supplementary database 130(2) may be more accurate with respect to longitude, latitude, and/or altitude. Further, the data in the supplementary database 130(2) may be more accurate with respect to derived information, such as curvature or vertical gradient.

The supplementary database 130(2) may also include more kinds of data (e.g., more kinds of attributes) than the data which is contained in the primary database 130(1). For example, the supplementary database 130(2) may include data about road objects, such as stop signs, traffic lights, guard rails, lane markings, no-passing or overtaking zones and crosswalks including their positions along the road segment. The supplementary database 130(2) may also include data indicating whether a road is tree-lined, bordered by culverts or other hazards, etc.

In another alternative, the map database 130 may include only a portion or subset of the data usually contained in a conventional map database used for navigation purposes. For example, the map database may contain only the information or attributes needed for supporting the driver assistance applications present in the vehicle. Depending on the driver assistance applications present in the vehicle, these attributes may only include the road geometry, speed, rank (or functional class), grade, altitude, superelevation, and so on.

Kinds of Data Attributes Included in the Map Database

As stated above, the map database 130 includes information about roads and intersections. According to one embodiment, the map database 130 represents each road segment with a separate segment data entity. Each node at the end point of a road segment is represented by a separate node data entity. The map database 130 includes (data) attributes associated with the segment data entities and (data) attributes associated with the node data entities. Node attributes relate to a property or characteristic of the end nodes of a segment. Segment attributes relate to a property or characteristic associated with the segment as a whole or with a specific point (location) along the segment.

Examples of node attributes include the following:

(1). The number of segments extending from the current node. This count includes the current segment (i.e., the entrance segment). All segments are counted, whether accessible or not.

(2). The number of possible turns the vehicle can perform at the specified node. (U-turns are not included in this count.)

In addition to the above, various other attributes may be associated with nodes, including geographic coordinates, altitude, name, identification (e.g., by ID number) of road segments connected thereto, turn restrictions, etc.

Curvature

According to one embodiment, included among the segment attributes is an attribute representing curvature. "Curvature" is a property of a point along a length of a segment. Curvature describes how a portion of a segment curves at that point. In one embodiment, curvature is defined for the points of a segment (i.e., shape points, nodes). Curvature is described by at least two components: a curvature direction (left curve, right curve and straight) and a curvature radius, and may include additional components of start and end point of curve, curve length, road surface type and bank (superelevation). No curvature radius is defined for the case of a straight or nearly straight line. (A segment for which the curvature radius exceeds a configurable threshold value may be considered a straight line.) In another embodiment, curvature is defined as a mathematical representation of the curve such as polynomial or spline function. In this case there may not be interim shape points or nodes throughout the curve.

Other Attributes

According to one embodiment, also included among the segment attributes are attributes relating to speed limits and changes, statistically dangerous intersections, stop signs, traffic lights, animal warnings, guard rails, culverts, hills, bumps, steeply banked roads, dirt roads, construction, children playing signs, etc.

The Data Engine 170

The data engine 170 is that component of the data horizon program 110 that calculates an electronic horizon (described in more detail below). The data engine 170 provides an output that includes the data representing the electronic horizon in an organized format. The data engine 170 provides this output on a cyclic basis.

In performing its functions, the data engine 170 uses data indicating the vehicle position (including direction and speed) as an input. The data engine 170 receives data indicating the vehicle position from a vehicle positioning tool which is one of the components of the software tools 150. The data indicating the vehicle position may include an identification of the road segment upon which the vehicle is located, the position along the identified road segment at which the vehicle is located, and the direction the vehicle is heading along the road segment. The road segment upon which the vehicle is located is determined by the vehicle positioning tool using data from the map database 130. The data engine 170 also obtains the speed of the vehicle (e.g., from the sensors 120 or 122).

The vehicle positioning tool may provide a new output indicating a new vehicle position at regular intervals. These intervals may be once per second, 10 times per second, 100 times per second, once every 2 seconds, or any other period. The intervals may also be irregular intervals or may be intervals based on some other factor, such as distance, or a combination of factors, such as time and distance. According to a present embodiment, the data receiving component 170(1) receives each output of the vehicle positioning tool indicating a new vehicle position.

The data engine 170 includes a process that determines which road segments and intersections should be represented in the output of the data engine 170. These segments and intersections represented in the output of the data engine 170 are the potential paths the vehicle may follow from the current vehicle position. The extent that each of these potential paths extends from the current vehicle position is determined. The "electronic horizon" refers to the collection of the roads and intersections leading out from the current vehicle position to the extents determined by this process of the data engine 170. Thus, the "electronic horizon" represents the road ahead of (or possibly behind) the vehicle. The electronic horizon is also a representation of potential driving paths of the vehicle from the current vehicle position. The "electronic horizon" also refers to the collection of data that represents the roads and intersections leading out from the current vehicle position to the aforementioned extents, including the road attributes, road objects, and road geometry of the road segments that form the electronic horizon.

To perform the function of determining the electronic horizon, the data engine 170 uses the data indicating the vehicle's current position to obtain data from the map database 130 that relates to all the roads around the vehicle's current position. If the map database 130 includes both a primary database and a supplementary database, the data engine 170 combines the primary and secondary data.

After obtaining data that relate to all the road segments around the vehicle's current position, the data engine 170 determines which road segments represent the electronic horizon. This step includes determining the extents (or boundaries) of the electronic horizon. In determining the extents of the electronic horizon, the data engine 170 provides that the potential paths extending from the current vehicle position are sufficiently large so that the driver assistance applications 200 that use the data output by the data horizon program 110 are provided with all the data they may need to perform their functions, given the speed and direction of the vehicle as well as specific requirements of each of the driver assistance applications 200. On the other hand, the data engine 170 builds an electronic horizon as small as possible in order to reduce the computational resources required to build it and also to reduce the computational resources required by the driver assistance applications 200 when using the data included in the electronic horizon.

The extents of the electronic horizon are determined using one or more costing functions, as explained in more detail in U.S. Pat. Nos. 6,405,128 and 6,735,515. Briefly, starting with the segment upon which the vehicle is currently located, each segment of each path leading away from the current vehicle position is evaluated for possible inclusion in the electronic horizon. The data engine 170 stops evaluating segments to add to a path from the current vehicle position when the path has at least a minimum threshold cost, if possible. The data engine 170 stops calculating an electronic horizon when all segments included in all the paths from the current vehicle position are determined. When the data engine 170 stops calculating an electronic horizon, the extents of the electronic horizon are determined.

According to one embodiment, the electronic horizon is represented by a tree from which the potential driving paths from the vehicle's current location diverge as branches. The data engine 170 forms this tree when determining which road segments and intersections to include in the electronic horizon. The tree that forms the electronic horizon includes components by which each point along each path can be specified and defined within the context of the entire tree structure. In this manner, formation of the electronic horizon is done in a consistent, reliable and reproducible manner. This provides features, such as a level of confidence that can be used by the advanced driver assistance system 200.

Primary Path

Some driver assistance applications require the processing of all possible paths within an electronic horizon (i.e., accessible and inaccessible paths). However, some driver assistance applications use a "primary path." A "primary path" is one specific path of the one or more potential paths within an electronic horizon. The primary path is the most likely path upon which the vehicle is expected to travel. The data horizon program 110 includes a feature by which a primary path can be determined and identified to a driver assistance application.

There are two aspects to the computation of the primary path. A first aspect is an estimation of the most likely driving path based on the local road geometry. A second aspect is the use of route information, if available. These aspects are discussed below.

The data engine 170 of the data horizon program 110 includes a primary path function 170(6). Included in the primary path function is a function ("LRN") that calculates a local-road-network-based most likely path ("LRNBMLP"). The function attempts to estimate how the vehicle will continue to travel within the current electronic horizon taking into account only the local road network. The function computes a single path as the LRNBMLP. The function computes the LRNBMLP as follows. The function LRN includes the first electronic horizon segment in the LRNBMLP. Then, the following steps for the selection of the next segment are repeatedly executed by the function LRN until a leaf node of the electronic horizon is found.

If only one accessible segment is attached to a node, that segment is chosen.

If more than one accessible segment is attached to a node, then from among all accessible segments the segment with the highest functional class is chosen. If two or more accessible segments have the same functional class which is higher than the functional class of each of the other segments, the segment with the highest functional class with the smallest turn angle is chosen. If there are two segments with the highest functional class and the same turn angle (e.g., one being a left and the other being a right turn), the right turn is chosen over the left turn.

As mentioned above, another aspect of determining a primary path of a vehicle is to use route information. Some vehicles include hardware and software that can calculate a route to a desired destination. A route calculation tool may be included among the software tools 150. The route calculation tool can be used to calculate a route to a desired destination. In one embodiment, the route calculation tool provides an output in the form of a data route. The data route is a list of consecutive and directed segments describing a legal way for a vehicle to drive from the first to the last segment of the route. A "route sub-path" of a route within some given electronic horizon is that path within the electronic horizon that matches some (or all) segments of a given route.

The primary path function 170(6) includes a function RTE that attempts to calculate a route-based path. A route-based path is that part of a calculated route which is located within an electronic horizon. Inputs to the function RTE include data indicating the route and data indicating the calculated electronic horizon. As a first step, the function RTE determines whether a route-based path can be defined for the electronic horizon. To perform this step, the function RTE attempts to locate the first segment of the electronic horizon in the calculated route. If the first segment of the electronic horizon cannot be found in the calculated route, the computation stops and the route-based path is undefined (i.e., there is no route-based path). However, if the first segment of the electronic horizon matches one of the segments in the calculated route, the route-based path is defined. (Note that in order for the first segment of the electronic horizon to match one of the segments in the calculated route, the function RTE requires that the direction of travel along the segment in both the electronic horizon and the calculated route be the same.) After the first segment of the electronic horizon is found in the calculated route, the function RTE continues to attempt to match segments from the paths in the electronic horizon with segments from the calculated route. As with the first segment, the function RTE requires that the direction of travel on the matching segments be the same. This matching process continues until no more segments from the paths of the electronic horizon can be found among the segments of the route. Matches are no longer found because a segment from the route for which a match is sought in the electronic horizon is not contained in (i.e., because the electronic horizon does not extend beyond some node) or the last segment of the route was reached and therefore no additional segments of the route can be matched in the electronic horizon.

The primary path computation function 170(6) computes a primary path using the outputs from the most likely path function and the route-based function. If a route has been defined and the route-based function was able to determine a route-based path, then that route-based path is selected as the primary path. However, if either a route has not been defined or it was not possible to compute a route-based path, the local road network most likely path (LRNBMLP) is used. An advantage of this method is to assume that the driver will follow a calculated route, if he/she has entered route information. However, if no route information is available, the local road network most likely path is the best estimate that can be provided.

Using the Advanced Driver Assistance System Map Data Architecture

The advanced driver assistance system map data architecture 100 provides a means by which one or more advanced driver assistance system applications 200 can use map data in support of the function(s) provided thereby. The advanced driver assistance system map data architecture provides advanced driver assistance system applications with access to data about road geometry and other attributes within the vicinity of the vehicle. For example, the advanced driver assistance systems map data architecture provides access to data representing any location along the road network near the vehicle that can be reached within 10 seconds of driving time. This portion of the road network corresponds to the electronic horizon. The electronic horizon is re-calculated regularly over time and/or as the vehicle moves along the road network. Once an electronic horizon has been calculated, the advanced driver assistance system application can use the data about the vehicle paths in the electronic horizon.

An advanced driver assistance application 200 can access the data represented by an electronic horizon with an electronic horizon handle. The advanced driver assistance application 200 relies on the listener 300 to obtain the ID of the latest electronic horizon from the data distributor 190. With the ID of the electronic horizon object, any or all of the data in the electronic horizon data object can be obtained. The electronic horizon data object identifies all the possible vehicle paths (or the primary path) out to the extent of the electronic horizon. The electronic horizon data object also identifies the segments and nodes in each path (i.e., using the segment descriptors and node descriptors, described above).

According to a present embodiment, advanced driver assistance applications may also obtain sensor data and vehicle position data.

II. Precautionary Action System

As stated above, the present embodiment includes a feature for a vehicle that takes a precautionary action in response to an upcoming condition on the road network. In order to provide this feature, the embodiment of FIG. 1 includes a priority list 400, a priority condition recognition routine 420, and a precautionary action application 440.

The priority list 400 is a data file that lists each type of condition on the road network for which a precautionary action will be taken. The priority list 400 is stored in a non-volatile portion of memory in the vehicle. In one embodiment, the priority list 400 is stored with the map database 130, although in alternative embodiments, the priority list 400 may be stored elsewhere or even included as part of the priority condition recognition software.

In addition to identifying each type of condition on the road network for which a precautionary action will be taken, the priority list 400 also identifies the relative priority associated with each of the listed conditions. In one embodiment, the priority list 400 identifies the relative priority of conditions by the order (sequence) of conditions on the list, e.g., the higher or earlier listed conditions having a greater priority or precedence than lower or later listed conditions. Alternatively, the conditions may be associated with numbers or codes that assign their relative ranking. These numbers or codes may relate to the severity of the condition from a driver assistance or hazard standpoint. The priority is based on the link (i.e., road segment) with the greatest severity of event (e.g., curve, speed change, intersection, etc.) and this prioritized list determines what precautionary action is taken.

Figure 2:
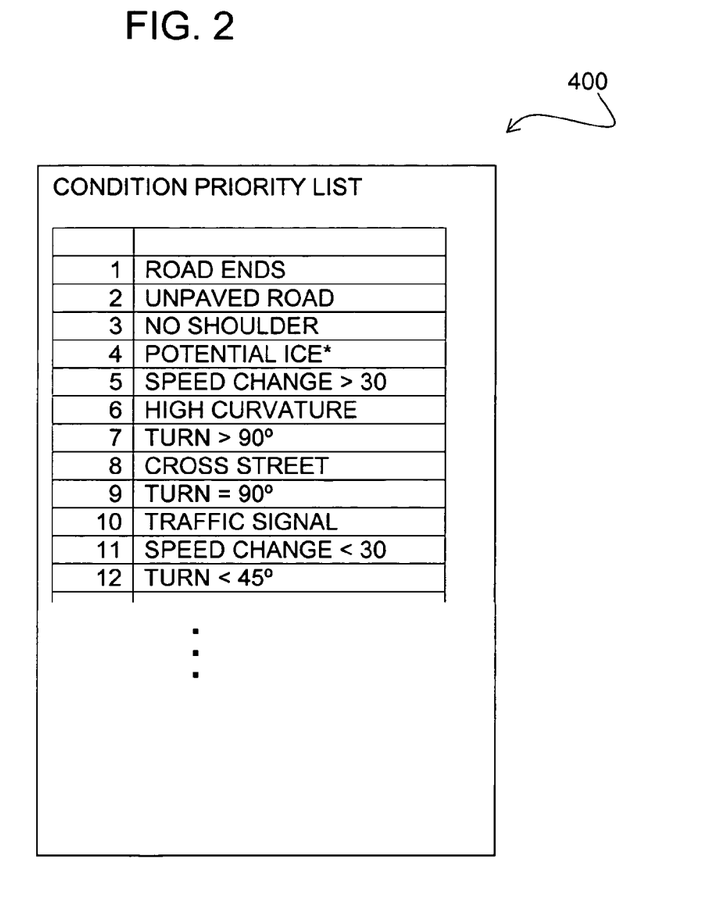
FIG. 2 is a diagram illustrating contents of the condition priority list shown in FIG. 1.

FIG. 2 shows an example of the priority list 400. The example shown in FIG. 2 includes only 12 conditions, although in alternative embodiments, dozens or even hundreds of conditions may be listed. Some of the examples of conditions on the priority list 400 include "road dead ends", high curvature, speed limit change and traffic signal.

Operation.

Figure 3:
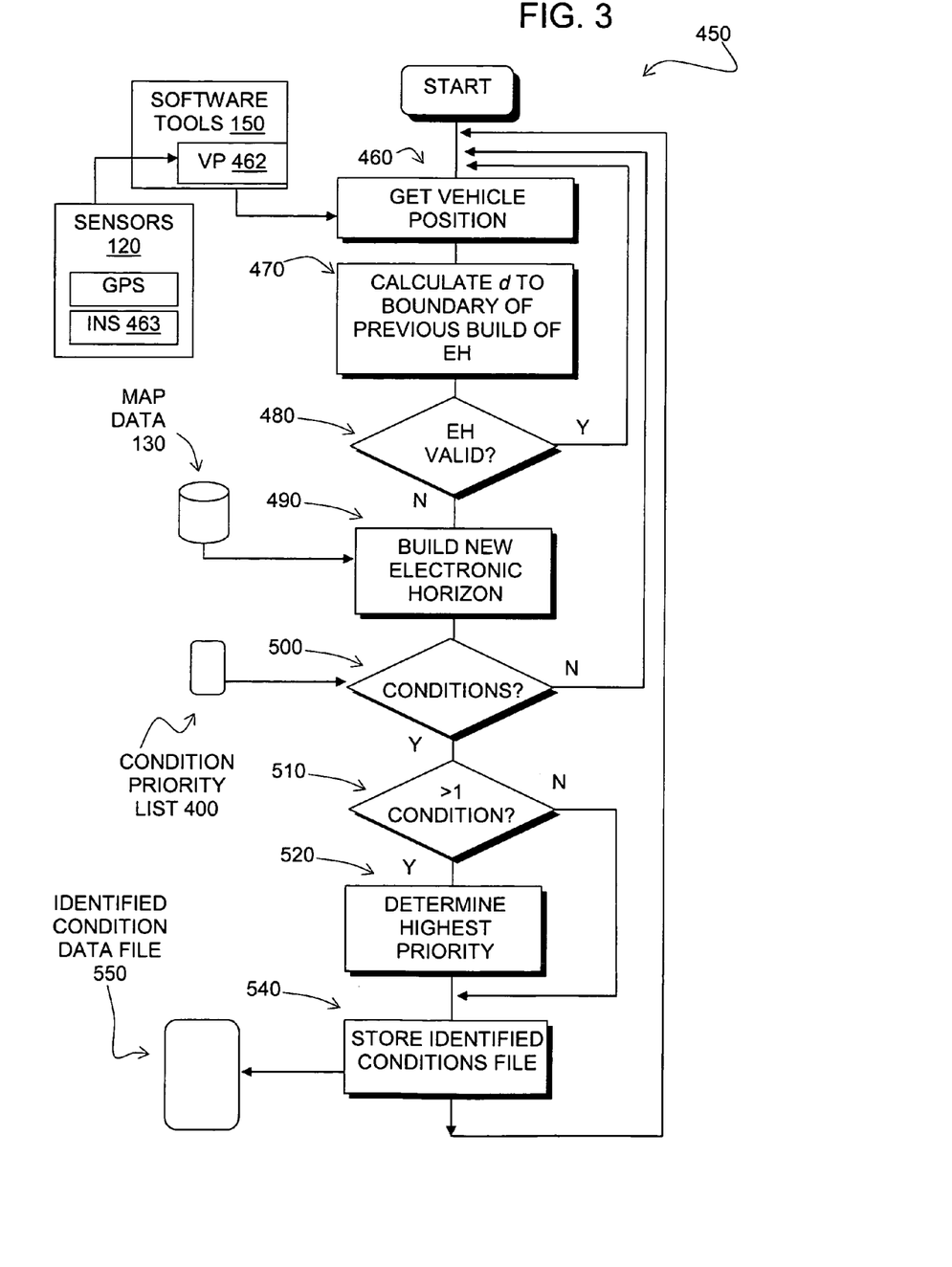
FIG. 3 is a flowchart of a process performed by the system of FIG. 1 for identifying conditions for which to take a precautionary action.

FIG. 3 shows steps in a process 450 for identifying conditions in the road network ahead of a current vehicle position in response to which a precautionary action may be taken. The process 450 includes steps performed by different components in FIG. 1.

In one step, the current position of the vehicle is obtained (Step 460). This step is part of the determination of the electronic horizon and may be performed by the data engine 170 (in FIG. 1). Information indicating the current position of the vehicle may be obtained from the vehicle position tool 462, which is one of the programs among the software tools 150. The vehicle position tool 462 may receive input from sensors 120, such as GPS equipment, inertial sensors 463, or sensors 122, such as Doppler radar or lidar, and so on.

Then, using the data that indicates the vehicle's current position, steps are performed to determine whether a new electronic horizon should be built. These steps may also be performed by the data engine 170 (in FIG. 1). In one embodiment, the distance to the boundary of the prior electronic horizon is determined (Step 470), and if the distance is less than a threshold (Step 480), a new electronic horizon is calculated (Step 490). As mentioned above, calculation of an electronic horizon is described in more detail in the '128 and '515 patents.

After the new electronic horizon is built, it is examined for conditions about which to take a precautionary action (Step 500). This step may be performed by the condition recognition routine 420 (in FIG. 1). The condition recognition routine 420 is a software program. In a present embodiment, the condition recognition routine 420 is part of the data engine 170.

The condition recognition routine 420 is executed each time a new electronic horizon (with new contents) is calculated by the data engine 170. The condition recognition routine 420 uses the priority list 400 as an input. The condition recognition routine 420 examines the data in a newly calculated electronic horizon to identify all the conditions listed in the priority list 400 that are present in the newly calculated electronic horizon. In some cases, the electronic horizon may contain the explicit information needed to determine whether a condition is present. In other cases, the condition recognition routine 420 may need to perform a calculation or analysis of the data to determine whether the condition is present (e.g., a turn angle).

If more than one condition exists in the new electronic horizon, the condition recognition routine 420 identifies each of the conditions that are present (Step 510) and their relative priority (Step 520).

Upon identifying all the conditions that are present in the new electronic horizon, the condition recognition routine 420 stores data that identifies all the conditions present in the new electronic horizon (Step 540). The data identifying the conditions is stored in an identified conditions data file 550 or other appropriate data structure. The identified conditions data file 550 identifying the conditions is stored and/or maintained with the electronic horizon.

In the identified conditions data file 550, each condition is identified. In one embodiment of the identified conditions data file 550, each condition is associated with data that indicates its location (e.g., relative to the road network), as well as a precautionary action location. The precautionary action location is a location along the road network at which an appropriate precautionary action in response to the condition may be taken. In some cases, the precautionary action location is a predetermined distance before the location of the condition (e.g., 30 meters). In other cases, the precautionary action location may be prior to a point of decision leading to the condition (e.g., just before an exit ramp at the end of which the condition is located). The condition location and the precautionary action location may be identified as a location along a road segment. The road segment may be identified by its electronic horizon designation, by a database ID, or by any other means.

If more than one condition exists in the new electronic horizon, the identified conditions data file 550 identifies the relative priority of each condition. The relative priority may be identified by a numeric ranking or by the order in which the conditions are listed in the identified conditions data file 550.

Figure 4:
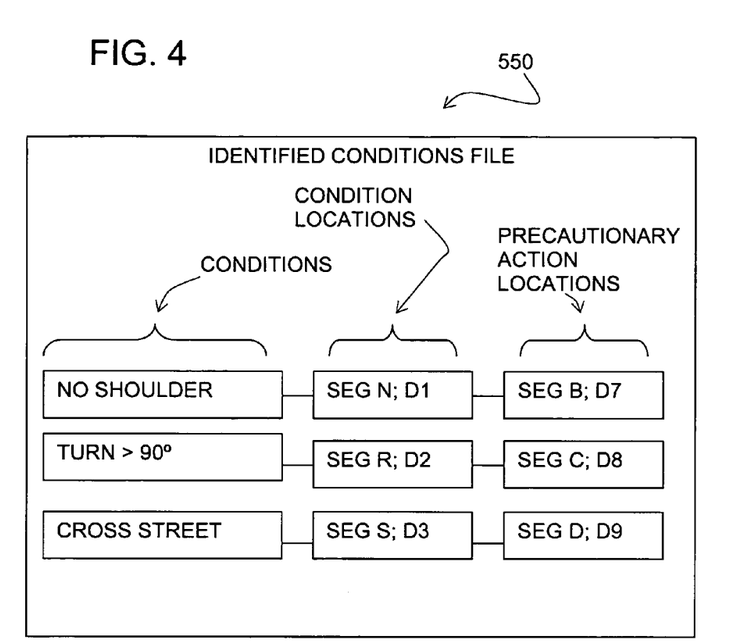
FIG. 4 is a diagram illustrating contents of the identified conditions file shown in FIG. 3.

FIG. 4 shows a diagram illustrating an example of the identified conditions data file 550.

Referring again to FIG. 3, the process 450 loops back to the step where the current vehicle is obtained (Step 460, again).

Figure 5:
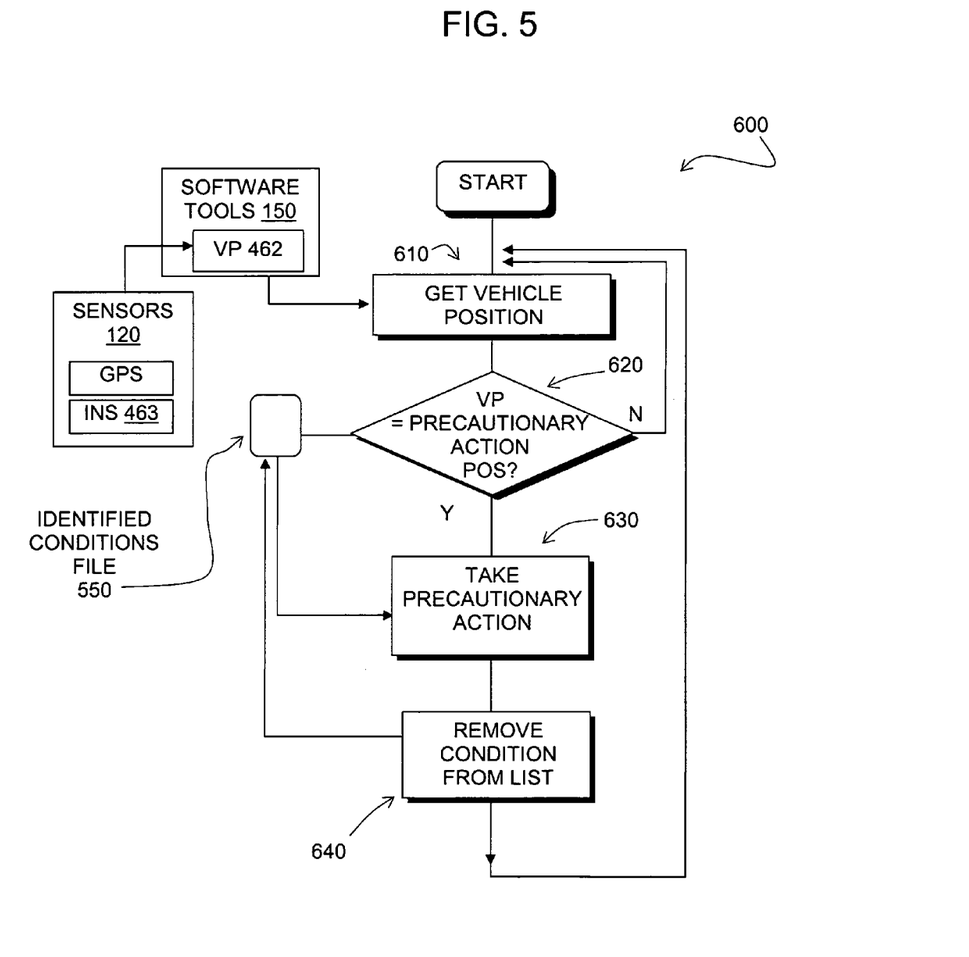
FIG. 5 is a flowchart of a process performed by the system of FIG. 1 for taking a precautionary action in response to an identified condition along the road network in proximity to the vehicle.

FIG. 5 shows steps in a process 600 in which the identified conditions data file 550 is used to take a precautionary action in response to an identified condition on the road network in proximity to the vehicle. The process 600 in FIG. 5 may run concurrently with the process 450 in FIG. 3.

In one embodiment, the process 600 is performed by the precautionary action application 440 (in FIG. 1). The precautionary action application 440 is a software program. In the present embodiment, the precautionary action application 440 may be included among other ADAS applications 200 in the vehicle 108, or alternatively the precautionary action application 440 may be separate from other ADAS applications 200. In still another alternative, the precautionary action application 400 may be provided in a vehicle that does not have any other ADAS applications.

In a first step of the process 600, the vehicle position is obtained (Step 610). As mentioned above, data indicating the vehicle position may be obtained from a vehicle position tool 462, which is one of the programs among the software tools 150. The vehicle position tool 462 may receive input from sensors 120, such as GPS equipment, inertial sensors 463, and so on.

Next, the process 600 determines whether the current vehicle position matches any of the precautionary action positions in the identified conditions data file 550 (Step 620). In determining whether a vehicle position matches any of the precautionary action positions, a tolerance threshold may be used, e.g., 10 meters or 10 seconds at the current speed. Alternatively, the threshold may be a function of the priority of the condition, for example a longer distance if the condition is a high priority condition such as "road dead ends."

If the current vehicle position matches a precautionary action position, an appropriate precautionary action is taken using the associated condition information and the condition location information from the file (Step 630). There are several types of precautionary actions that may be taken. One type of precautionary action is providing an alert message to the driver via a user interface of the vehicle. The alert message may be provided in an audio, visual or haptic message, or as any combination of audio, visual and haptic messages. An example of an alert message is as follows:

"ON THE NEXT EXIT RAMP, A TRAFFIC SIGNAL IS LOCATED IN 200 METERS."

Other types of precautionary actions may be taken, either in place of providing an alert message to the driver or in combination with providing an alert message to the driver. Some of these other types of precautionary actions include: slowing down or stopping the vehicle, preloading the vehicle brakes, accelerating the vehicle, modifying the vehicle direction, modifying the vehicle's suspension characteristics, and activating (or modifying operation of) a vehicle sensor. A precautionary action may also include providing a message or signal to an algorithm that also receives messages or signals from other sensors or systems and that determines an action to be taken based on evaluating, weighing and combining these various inputs. This list of precautionary actions is not exclusive, and other types of precautionary actions are intended to be included.

In order to take a precautionary action that modifies operation or control of the vehicle, the precautionary action application 440 outputs a signal to the appropriate vehicle actuator or control. The signal is used to bring about the appropriate precautionary action.

As an example, information from an identified conditions data file about an approaching steep downhill segment may be provided to an adaptive cruise control system, collision mitigation system, or electronic stability control system to adjust braking force and timing for the down road gradient condition.

After the precautionary action is taken, the identified condition is removed from the identified conditions file 550 (Step 640). The process 600 then loops back to the step of obtaining a current position of the vehicle (Step 610, again).

When a new electronic horizon is calculated (Step 490 in FIG. 3) and a new identified conditions data file 550 developed and associated with it (Step 540), the identified conditions data file used in the process 600 (in FIG. 5) is replaced with the new file.

EXAMPLE

Figure 6A:
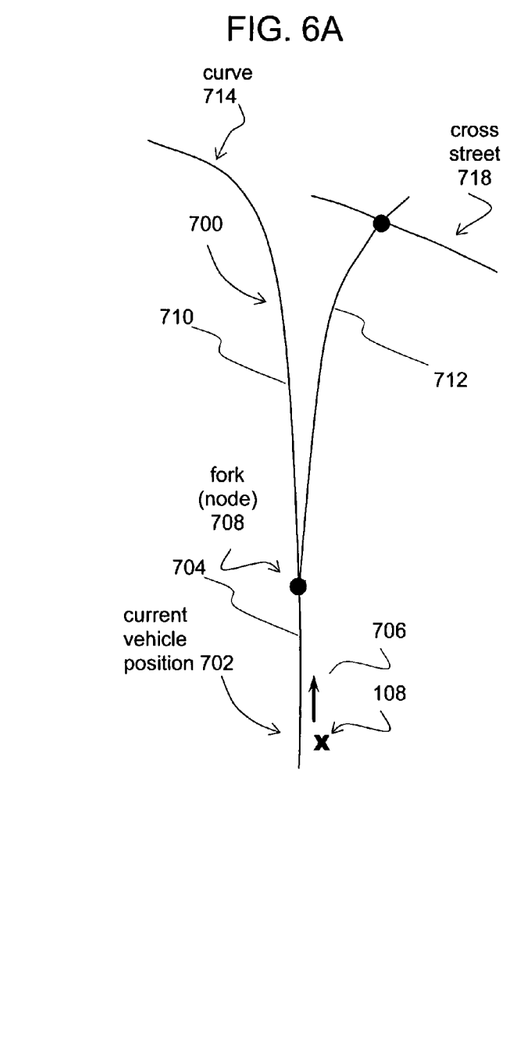
FIGS. 6A and 6B show a portion of a road network and are used to describe an example explaining operation of the embodiment in FIG. 1.
Figure 6B:
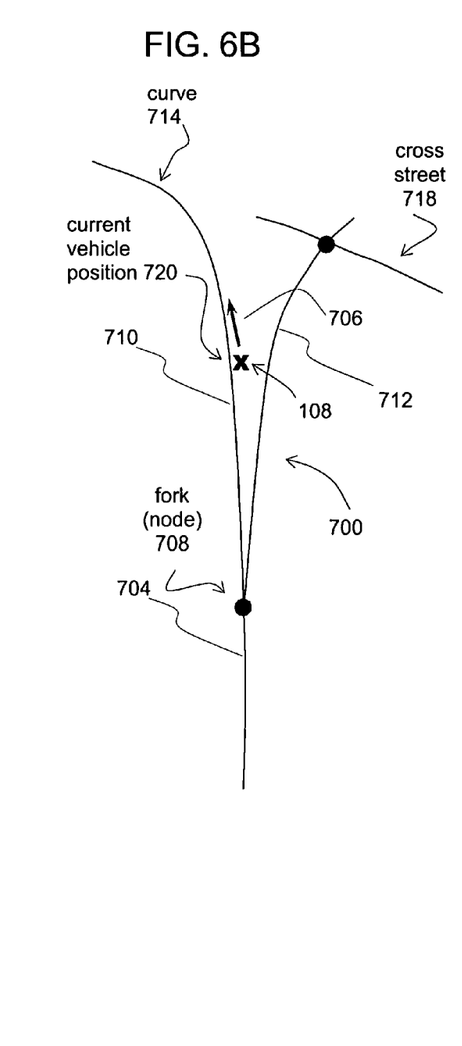

Referring to FIGS. 6A and 6B, an example of how an embodiment of the precautionary action application operates is described. FIGS. 6A and 6B show a portion of a road network 700 upon which the vehicle 108 is traveling. The vehicle 108 has the precautionary action application (440 in FIG. 1) and related systems and applications installed therein.

In FIG. 6A, the vehicle 108 is at a position 702 traveling along a road segment 704 heading in the direction indicated by the arrow 706. The vehicle 108 is heading toward a fork 708 from which two branches, road segments 710 and 712, extend. Located along the road segment 710 is a moderate curve 714. Located along the other road segment 712 is a cross street 718.

When the vehicle 108 is at the position 702 in FIG. 6A, the electronic horizon includes the road segments 704, 710, and 712. The condition recognition application identifies the curve 714 and the cross street 718 as conditions for which to take a precautionary action. Based on the listing of relative priority, the cross street is identified as the condition with the highest priority. Therefore, a precautionary action relating to the cross street is taken when the vehicle is at the position 702. For example, a warning may be provided to the vehicle driver that states "WARNING: A CROSS STREET IS LOCATED IMMEDIATELY ALONG THE ROAD BRANCHING RIGHT FROM THE FORK AHEAD."

FIG. 6B shows the same portion of the road network 700 shown in FIG. 6A. In FIG. 6B, the vehicle 108 has moved to a new position 720, which is along the road segment 710. A new electronic horizon calculated for the vehicle at position 720 does not include the road segment 712. Therefore, the condition recognition application identifies the curve 714 as the condition for which to take a precautionary action. A precautionary action relating to the curve is taken when the vehicle is at the position 720. For example, a warning may be provided to the vehicle driver that states "WARNING: A CURVE IS LOCATED IMMEDIATELY AHEAD."

When there is more than condition identified in an electronic horizon that warrants taking a precautionary action, a precautionary action may be taken first for the condition with the highest priority. After the precautionary action is taken for the condition with the highest priority, a precautionary action may be taken for one or more of the other identified conditions, based on their relative priority or based on their relative proximity to the current vehicle position.

The embodiments described above enable precautionary actions to be taken in response to upcoming conditions on the road network. The feature may be used to take precautionary actions even when a driver is not receiving guidance for following a route to a desired destination. When a vehicle driver is being provided guidance for following a route to a desired destination, precautionary actions may be taken only for those conditions along the calculated route. In an alternative embodiment, even when a vehicle driver is receiving guidance for following a route to a desired destination, precautionary actions may be taken in response to conditions not on the route just in case the driver intentionally or inadvertently departs from the calculated route. In yet another alternative, the vehicle driver may be able to choose (via a selection menu provided by the vehicle user interface) to suppress taking precautionary actions in response to conditions that are not on a calculated route.

It is intended that the foregoing detailed description be regarded as illustrative rather than limiting and that it is understood that the following claims including all equivalents are intended to define the scope of the invention.

I claim:

1. A non-transitory computer-implemented method embedded in a computer readable medium for taking a precautionary action in a vehicle comprising:
   determining a current position of the vehicle;
   using a data representation of a road network to determine a part of the road network around the current position of the vehicle, wherein the part of the road network includes a portion of each road accessible from the current position of the vehicle and extending out to a threshold;
   using the data representation of the road network to identify conditions, if any, corresponding to locations along said part of the road network around the current position of the vehicle that warrant taking the precautionary action;
   when more than one condition is identified from the current position of the vehicle, using a data file that lists conditions by priority to determine which of the conditions has a level of importance greater than any other of the conditions, wherein the data file is stored in a non-volatile portion of memory prior to vehicle operation; and
   taking the precautionary action for the condition that has a level of importance greater than any other of the conditions.

2. The method of claim 1 wherein the data file is stored in the vehicle.

3. The method of claim 1 wherein at least one of said conditions is a sharp turn.

4. The method of claim 1 wherein at least one of said conditions is a traffic signal.

5. The method of claim 1 wherein at least one of said conditions is a speed limit change.

6. The method of claim 1 wherein at least one of said conditions is a hill.

7. The method of claim 1 wherein at least one of said conditions is a lane count change.

8. The method of claim 1 wherein at least one of said conditions is a no-passing zone.

9. The method of claim 1 wherein at least one of said conditions is a stop sign.

10. The method of claim 1 wherein at least one of said conditions is a dangerous intersection.

11. The method of claim 1 wherein the precautionary action comprises providing a message to alert a driver of the vehicle about the associated condition.

12. The method of claim 11 wherein the message is provided to the driver prior to a decision point on the road network leading to a location associated with said condition.

13. The method of claim 1 wherein the precautionary action comprises:
    stopping the vehicle.

14. The method of claim 1 wherein the precautionary action comprises:
    slowing down the vehicle.

15. The method of claim 1 wherein the precautionary action comprises:
    preloading the vehicle brakes.

16. The method of claim 1 wherein the precautionary action comprises:
    speeding up the vehicle.

17. The method of claim 1 wherein the precautionary action comprises:
    changing a direction of travel of the vehicle.

18. A computer-implemented method embedded in a non-transitory computer readable medium for taking a precautionary action in a vehicle comprising:
    determining a current position of the vehicle;
    using a data representation of a road network to determine a part of the road network around the current position of the vehicle, wherein the part of the road network includes a portion of each road accessible from the current position of the vehicle and extending out to a threshold;
    upon determining that a driver of the vehicle is not being provided guidance to follow a route to a desired destination, using the data representation of the road network to identify each condition, if any, corresponding to a location along said part of the road network around the current position of the vehicle that warrants taking the precautionary action;
    using a priority list to identify relative priority of the identified conditions if more than one condition is identified from the current position of the vehicle, wherein the priority list is stored in a non-volatile portion of memory prior to vehicle operation; and
    taking the precautionary actions in an order corresponding to the priority list.

19. The method of claim 18 wherein the precautionary action comprises providing a message to alert the driver of the vehicle about the condition.

20. The method of claim 18 further comprising:
    upon determining that the driver of the vehicle is being provided guidance to follow a route to a desired destination, using the data representation of the road network to identify conditions, if any, corresponding to locations along said part of the road network around the current position of the vehicle and that coincide with said route that warrants taking the precautionary action; and
    taking the precautionary action in response to any of said conditions.

21. An apparatus comprising:
- at least one processor; and
- at least one memory including computer program code for one or more programs; the at least one memory and the computer program code configured to, with the at least one processor, cause the apparatus to at least perform a method for taking a precautionary action in a vehicle comprising:
- determining a current position of the vehicle;
- using a data representation of a road network to determine a part of the road network around the current position of the vehicle, wherein the part of the road network includes a portion of each road accessible from the current position of the vehicle and extending out to a threshold;
- using the data representation of the road network to identify conditions, if any, corresponding to locations along said part of the road network around the current position of the vehicle that warrant taking the precautionary action;
- when more than one condition is identified from the current position of the vehicle, using a data file that lists conditions by priority to determine which of the conditions has a level of importance greater than any other of the conditions, wherein the data file is stored in a nonvolatile portion of memory prior to vehicle operation; and
- taking the precautionary action for the condition that has a level of importance greater than any other of the conditions.

* * * * *